United States Patent [19]

Hormadaly

[11] Patent Number: 5,491,118
[45] Date of Patent: Feb. 13, 1996

[54] CADMIUM-FREE AND LEAD-FREE THICK FILM PASTE COMPOSITION

[75] Inventor: Jacob Hormadaly, Omer, Israel

[73] Assignee: E. I. Du Pont de Nemours and Company, Wilmington, Del.

[21] Appl. No.: 359,768

[22] Filed: Dec. 20, 1994

[51] Int. Cl.⁶ ................................................. C03C 14/00
[52] U.S. Cl. .......................... 501/20; 501/17; 501/21; 501/26; 501/73; 501/77; 501/79; 501/32; 252/518; 252/521
[58] Field of Search ................................. 501/73, 17, 20, 501/77, 79, 26, 21, 32; 252/518, 521

[56] References Cited

U.S. PATENT DOCUMENTS

| | | | |
|---|---|---|---|
| 4,436,829 | 3/1984 | Howell | 501/32 X |
| 4,906,406 | 3/1990 | Hormadaly | 501/32 X |
| 4,961,999 | 10/1990 | Hormadaly | 501/32 X |
| 5,122,302 | 6/1992 | Hormadaly | 501/17 X |
| 5,244,601 | 9/1993 | Burckhardt et al. | 501/17 X |
| 5,378,408 | 1/1995 | Carroll et al. | 501/19 X |
| 5,439,852 | 8/1995 | Hormadaly | 501/73 X |

*Primary Examiner*—Karl Group

[57] ABSTRACT

The invention is directed to a lead-free and cadmium-free thick film paste composition suitable for forming resistor or thermistor patterns on a substrate.

9 Claims, 9 Drawing Sheets

CADMIUM-FREE AND LEAD-FREE THICK FILM PASTE COMPOSITION

CROSS REFERENCE TO RELATED APPLICATION

This application is related to application Ser. No. 08/284,021 filed Aug. 1, 1994, now U.S. Pat. No. 5,439,852, entitled "Cadmium-Free and Lead-Free Thick Film Conductor Composition" (Agent docket number EL-0373).

FIELD OF THE INVENTION

The invention is directed to thick film paste compositions particularly such compositions which use cadmium-free and lead-free glass frits as binders and ruthenium based compounds as the conductive phase. The compositions of the present invention may be used for making thick film resistors and thermistors.

BACKGROUND OF THE INVENTION

Thick film materials are mixtures of metal, glass and/or ceramic powders dispersed in an organic vehicle. These materials are applied to nonconductive substrates to form conductive, resistive or insulating films. Thick film materials are used in a wide variety of electronic and light electrical components.

The properties of individual compositions depend on the specific constituents which comprise the compositions. All compositions contain three major components. The conductive phase determines the electrical properties and influences the mechanical properties of the final film. In conductor compositions, the conductive phase is generally a precious metal or mixture of precious metals. In resistor compositions the conductive phase is generally a metallic oxide. In dielectric compositions, the functional phase is generally a glass or ceramic.

The binder of the compositions is usually a glass, a crystalline oxide or a combination of the two. The binder holds the film together and adheres it to the substrate. The binder also influences the mechanical properties of the final film.

The vehicle of the compositions is a solution of polymers in organic solvents. The vehicle determines the application characteristics of the composition.

In the compositions, the functional phase and binder are generally in powder form and are thoroughly dispersed in the vehicle.

Thick film materials are applied to a substrate. The substrate serves as a support for the final film and may also have an electrical function, such as a capacitor dielectric. Substrate materials are generally nonconducting.

The most common substrate materials are ceramics. High-purity (generally 96%) aluminum oxide is the most widely used. For special applications, various titanate ceramics, mica, beryllium oxide and other substrates are used. These are generally used because of specific electrical or mechanical properties required for the application.

In some applications where the substrate must be transparent, such as displays, glass is used.

Thick film technology is defined as much by the processes, as by the materials or applications. The basic thick film process steps are screen printing, drying, and firing. The thick film composition is generally applied to the substrate by screen printing. Dipping, banding, brushing or spraying are occasionally used with irregular shaped substrates. Thick film (TF) resistors and thermistor pastes have been used in the manufacture of ceramic circuit boards. Thermistors are thermally sensitive resistors which have a large temperature coefficient of resistance. They are of two kinds. The first kind exhibits a positive change in resistance with increasing temperature (PTC) and the second kind exhibits a negative change in resistance with increasing temperature (NTC). NTC thermistors ordinarily consist of sintered semiconductive materials and can be used to make elements having resistance values of 10 to 1,000,000 ohms at room temperature. The operational range of such thermistors extends from 75 to 1275K. Therefore, they find extensive use as temperature sensors.

Thermistors are, however, used extensively for such applications as an electronic time delay, capacitor inductor in low frequency oscillators, surge suppressor, voltage or current limiter, gas pressure sensor, thermoconductivity detector, liquid or gas flow sensor and solid or liquid level indicator. Various compositions have been described in the literature for processing in air (oxidizing) atmosphere. The majority of these compositions are based on ruthenium compounds as a conductive phase and lead-cadmium glasses which serve as a binder and need the air (oxidizing) atmosphere.

Conductive phases such as $LaB_6$ and doped tin oxide have been disclosed for processing in inert and reducing atmospheres. These compositions contain lead and Cd free glasses. However, these compositions cannot be processed in air because the conductive phases oxidize in air. The oxidation in air render these conductive phases insulators ($LaB_6$) and inappropriate (doped $SnO_2$) for resistor use, due to intrinsic change in electrical properties.

Resistive pastes of the prior art tend to have high positive temperature coefficient of resistance (TCR) at low resistance; usually at $\geq 10\Omega/\square/mil$. To lower the TCR of these resistive pastes it is common to add TCR drivers to them. TCR drivers such as manganese oxide, $Nb_2O_5$ and $TiO_2$ to lower the TCR, however, they also raise the resistance. To compensate for the increase in resistance it is a common practice to add more conductive phase. As a result of TCR and resistance optimization the prior art low resistance pastes tend to have high volume fraction of conductive phase and less vitreous phase. This process impacts the stability of low resistance pastes and they are less stable than mid range $100\Omega/\square$–$100 k\ \Omega/\square$ resistive pastes.

TF thermistor compositions especially of the NTC (negative temperature coefficient of resistance) type have a larger TCR at low resistances. Moreover, it is difficult to make low resistance NTC pastes; U.S. Pat. No. 5,122,302 to J. Hormadaly discloses NTC type thick film thermistor pastes in which it is shown that TCR increases when R decreases and only the $1 k\ \Omega/\square$–$1M\ \Omega/\square$ range is disclosed.

Nontoxic lead-free and cadmium-free frit systems which are low melting, moderate in expansion and durability that provide excellent wetting are not, however, known in the art for use in the above composition. Therefore, consistent with efforts to reduce or eliminate lead and cadmium from broad categories of products containing glass frits, the present invention deals with a lead-free and cadmium-free glass frit that has been shown to be useful in the formulation of thick film paste compositions. The composition of the present invention renders a nontoxic, cadmium-free/lead-free thick film alternative to presently used resistor and thermistor compositions.

SUMMARY OF THE INVENTION

The invention is directed to a thick film paste composition suitable for forming resistor or thermistor patterns on a substrate comprising by weight %, basis solids (a) 5–65% wt. ruthenium-based conductive materials; (b) 95–35% wt. glass composition comprising by mole % 5–70% $Bi_2O_3$, 18–35% $SiO_2$, 0.1–40% CuO, 5–25% ZnO, 0.5–40% CoO, 0.5–40% $Fe_2O_3$, and 0.5–40% MnO, wherein the glass composition is free of lead and cadmium; and, all of (a) and (b) dispersed in an organic medium.

The thick film paste composition may also comprise (a) 5–65% wt. ruthenium-based conductive materials; (b) 95–35% wt. glass composition consisting essentially of by mole % 0–2% MgO, 0–20% BaO, 0–6% $Al_2O_3$, 0–45% $B_2O_3$, 0–5% $ZrO_2$, 18–35% $SiO_2$, 5–70% $Bi_2O_3$, 0–25% ZnO, 0.2–40% CuO, 0.1–40% CoO, 0.5–40% $Fe_2O_3$, and 0.5–40% MnO, wherein the glass composition is free of lead and cadmium; and, all of (a) and (b) dispersed in an organic medium.

PRIOR ART

The closest prior art that Applicant is aware of at the time of filing this application follows: U.S. Pat. Nos. 4,707,346 and 4,613,539 to J. Hormadaly and 4,966,926 to P. Donohue disclose conductive phases such as $LaB_6$ and compositions of tantalum and/or niobium doped tin oxide conductive materials based on a pyrochlore phase, e.g. $Sn_{2-x}Ta_{2-y-z}Nb_y Sn_z O_{7-x-z/2}$ (where x=0–0.55; y=0–2; Z=0–0.5). These materials may be used to prepare thick film resistor composition in a wide variety of electronic and light electrical components. These materials contain Cd and Pb free glasses and are processed in inert or reducing atmospheres. They cannot be processed in air because the conductive phases oxidize. The oxidation in air render these conductive phases insulators ($LaB_6$) and inappropriate (doped $SnO_2$) for resistor use, due to intrinsic change in electrical properties.

BRIEF DESCRIPTION OF THE DRAWINGS

The drawings consist of nine figures which are graphical correlations of sample properties of low TCR and gap or resistance in relation to the ratio of [Example 11 glass (Example 11 glass+Example 2 glass)].

DETAILED DESCRIPTION OF THE INVENTION

The objectives of the present invention are to:

Provide Cd & Pb free resistive pastes;

Provide a method to lower the TCR of low resistance compositions without the use of conventional TCR drivers;

Provide low resistance NTC thermistors; and

Enhance existing technology by lowering resistance and eliminating the use of TCR drivers.

A. Inorganic Binder

A frit is required for bonding sintered active phase (such metals, resistor, and dielectric) powders, thus the softening point and viscosity of the frit during firing, as well as its wetting characteristics for the metal powder and the substrate are all important characteristics. The particle size of the frit is not narrowly critical and frits useful in the present invention will typically have an average particle size from about 0.5 to 4.5 microns, preferably from about 1 to about 3 microns. The amount of binder will typically be from about 1 to 95% by weight of the conductor composition (excluding the organic medium), preferably about 5 to 85% by weight, and more preferably about 10 to 70% by weight. Wetting of a solid surface by a liquid is defined in a general sense in terms of a contact angle formed between liquid-solid interface and a tangent to the surface of the liquid at the contact point. The smaller the contact angle, the better the wetting that is exhibited and the less glass that is required to completely wet a given surface area of solid. A preferred firing temperature is between 600° to 1000° C.

The frit is an important component of a composition it helps in the minimization of stress between a thick-film conductor and a substrate. This minimization is dependent upon its thermal expansion properties, respective moduli of elasticity and relative thickness.

Prior art glasses for resistor and thermistor compositions have been based on cadmium or lead frits. Eliminating lead and cadmium from the compositions to meet the current toxicity and environmental concerns limits the options for finding a glass suitable for low softening and flow properties while also meeting wettability, thermal expansion and performance requirements. The current invention deals with the unexpected outstanding performance of a series of glasses based upon the constituents: $Bi_2O_3$, $SiO_2$, CuO, ZnO, CoO, $Fe_2O_3$ and MnO.

Compositionally, the above glass may be blended with a second glass. Glasses for use in the invention as a second glass are borosilicate glasses which contain by mole %, 65–85% glass-forming oxides and 35–15% glass-modifying oxides.

The primary glass-forming oxides are $B_2O_3$ which is used at a concentration of 25–55% of the glass and $SiO_2$ which is used at a concentration of 40 to 10% of the glass. The glass should contain at least 25% $B_2O_3$ to ensure that the viscosity of the glass during firing is not excessively high. However, if the $B_2O_3$ content is higher than about 55%, the durability of the glass is likely to be reduced to unacceptable levels.

The glass may also contain conditional glassforming oxides up to a concentration of 30%. Such conditional glass-forming oxides include $Al_2O_3$, $Bi_2O_3$, $ZrO_2$ and mixtures thereof. While these conditional glass-forming oxides are not considered essential for all applications of the invention, it is nevertheless preferred that the glass contain at least about 10% and preferably 15% of such secondary glass-forming oxides. In particular, $Bi_2O_3$ is desirable to lower viscosity of the glass and enhance the glass firing range. On the other hand, $Al_2O_3$ is desirable not only to enhance the glass-forming range, but also improve its durability.

The primary glass modifiers for use in the optional second glass of the invention are the alkaline earth metal oxides which can be used in amounts up to 35% of the total glass. The alkaline earth metal oxides can be used either individually or in admixture. However, it is preferred that no more than 10% MgO be used, lest the glass tends to crystallize when it is subjected to thick film processing conditions. Up to 80% of the primary alkaline earth metal oxide glass modifiers can be substituted by secondary or substitute glass modifiers such as ZnO, $Cu_xO$ ($Cu_2O$ or CuO) or $ZrO_2$. However, the glass binder should contain no more than 15% wt. of any of these substitute glass formers, lest the viscosity of the glass at firing temperature becomes too high.

The invention is not limited to the above descriptions. It may further be extended to a single cadmium-free and lead-free glass with ranges obtained from blending two or more glasses of Examples 1–10 from Table I with Example 11 of the Table to obtain compositional ranges as disclosed. Furthermore, the compositional ranges of this invention may, also, be obtained by mixing two or more suitable glasses or by making one glass or by mixing glasses with appropriate crystalline phases.

B. Electrically Functional Materials

The invention is directed to resistor compositions in which the principal conductive phase is ruthenium oxide-based. At the present state of the art of ruthenium oxide-based resistors, this is known to include $RuO_2$ and ruthenium compounds corresponding to the formula $(M_cBi_{2-c}) (M'_dRu_{2-d}) O_{7-e}$ wherein M is at least one of the group consisting of yttrium, indium, and the rare earth metals of atomic number 57-71, inclusive:

M' is at least one of platinum, titanium, chromium, rhodium and antimony;

c is a number in the range of 0 to 2;

d is a number in the range 0 to about 0.5, that d is a number is the range 0 to 1 when M' is rhodium or more than one of platinum, and titanium; and e is a number in the range 0 to 1.

These compounds and their preparation are disclosed in U.S. Pat. No. 3,583,931 to Bouchard and also in German patent application OS 1,816,105 and are incorporated as references herein.

The particle size of the above-described ruthenium-containing materials is not narrowly critical from the standpoint of their technical effectiveness in the invention. However, they should, of course, be of a size appropriate to the manner in which they are applied, which is usually screen printing, and to the firing conditions. Thus the metallic material particles should be no bigger than 10 µm and preferably should be below about 5 µm. As a practical matter, the available particle size of the metals is as low as 0.1 µm. It is preferred that the ruthenium component have an average surface area of at least 5 $m^2/g$ and still more preferably at least 8 $m^2/g$.

Preferred ruthenium compounds include $Bi_2Ru_2O_7$ and $RuO_2$. Particularly preferred for use in the invention are ruthenium-based oxides such as $RuO_2$ and pyrochlore-like polynary oxides of Ru such as bismuth and bismuth gadolinium ruthenates.

The cobalt ruthenate material will ordinarily be used at a concentration above 15% by weight of the composition solids. Concentrations of 30 to 60% and especially 30 to 50% are preferred.

It is preferred that the cobalt ruthenate have a high surface area since the material is more efficient in its function. A surface area of at least 0.5 $m^2/gm$ is preferred. Typically, the $Co_2RuO_4$ material used in the invention has a surface area of about 0.8 $m^2/gm$.

Cobalt ruthenate is made quite simply by (1) forming an aqueous dispersion of $CO_3O_4$ and $RuO_2$, (2) drying the dispersion and then (3) firing the dried dispersion in air at a temperature of at least about 850° C. to form the cobalt ruthenate.

It will ordinarily be preferred to use approximately stoichiometric amounts of the $Co_3O_4$ and $RuO_2$. However, small excesses of the $RuO_2$ are not at all harmful to the effectiveness of the cobalt ruthenate material. It should be noted that when the reaction is carried out in an alumina vessel, a small amount of $CoAl_2O_4$ may be formed. However, this can easily be avoided by using a reaction vessel made of platinum or other more inert material.

As is the case for the ruthenate component of the invention, the particle size of the cobalt ruthenate is not narrowly critical, but should be of size appropriate to the manner in which the composition is applied.

In addition, precursors of $RuO_2$, that is ruthenium compounds which upon firing will form $RuO_2$, are suitable for use in the invention, as are mixtures of any of these materials as well. Exemplary of suitable nonpyrochlore $RuO_2$ precursors are ruthenium metal, ruthenium resinates, $BaRuO_3$, $Ba_2RuO_4$, $CaRuO_3$, $Co_2RuO_4$, $LaRuO_3$, and $Li_2RuO_3$.

The composition may contain 5–75% wt. of the ruthenium-based component, it is preferred that it contain 10–60%.

C. Organic Medium

The inorganic particles are mixed with an essentially inert liquid medium (vehicle) by mechanical mixing (e.g., on a roll mill) to form a paste-like composition having suitable consistency and rheology for screen printing. The latter is printed as a "thick film" on conventional dielectric substrates in the conventional manner.

Any inert liquid may be used as the vehicle. Various organic liquids, with or without thickening and/or stabilizing agents and/or other common additives, may be used as the vehicle. Exemplary of organic liquids which can be used are the aliphatic alcohols, esters of such alcohols, for example, acetates and propionates, terpenes such as pine oil, terpineol and the like, solutions of resins such as the polymethacrylates of lower alcohols, and solutions of ethyl cellulose in solvents such as pine oil, and the monobutyl ether of ethylene glycol monoacetate. A preferred vehicle is based on ethyl cellulose and beta terpineol. The vehicle may contain volatile liquids to promote fast setting after application to the substrate.

The ratio of vehicle to solids in the dispersions can vary considerably and depends upon the manner in which the dispersion is to be applied and the kind of vehicle used. Normally to achieve good coverage the dispersions will contain complementally, 60–90% solids and 40–10% vehicle. The compositions of the present invention may, of course, be modified by the addition of other materials which do not affect its beneficial characteristics. Such formulation is well within the skill of the art.

The pastes are conveniently prepared on a three-roll mill. The viscosity of the pastes is typically within the following ranges when measured on a Brookfield HBT viscometer at low, moderate and high shear rates:

| Shear Rate (Sec.$^{-1}$) | Viscosity (Pa-s) |
| --- | --- |
| 0.2 | 100–5000 |
| | 300–2000 Preferred |
| | 600–1500 Most Preferred |
| 4 | 40–400 |
| | 100–250 Preferred |
| | 140–200 Most Preferred |
| 384 | 7–40 |
| | 10–25 Preferred |
| | 12–18 Most Preferred |

The amount of vehicle utilized is determined by the final desired formulation viscosity.

Test Procedures

The hot and cold temperature coefficients of resistance (TCR) are calculated as follows:

$$\text{Hot } TCR = \frac{R_{125°C.} - R_{25°C.}}{R_{25°C.}} \times (10{,}000 \text{ ppm/°C.})$$

$$\text{Cold } TCR = \frac{R_{55°C.} - R_{25°C.}}{R_{25°C.}} \times (-12{,}500) \text{ ppm/°C.}$$

The values of $R_{25°C.}$ and Hot and Cold TCR are averaged and $R_{25°C.}$ values are normalized to 25 microns dry printed thickness and resistivity is reported as ohms per square at 25 microns dry print thickness. Normalization of the multiple test values is calculated with the following relationship:

$$\frac{\text{Avg. measured resistance} \times \text{Avg. dry print thickness, microns}}{25 \text{ microns}}$$

The coefficient of variance (CV) is a function of the average and individual resistances for the resistors tested and is represented by the relationship Rav, wherein $$\sigma = \sqrt{\frac{\sum_i (R_i - R_{av})^2}{n-1}}$$

$R_i$=measured resistance of individual sample
$R_{av}$=calculated average resistance of all samples ($\Sigma_i R_i/n$)
n=number of samples
CV=($\sigma$/R)×100(%)

Resistance Measurement and Calculations

The test substrates are mounted on terminal posts within a controlled temperature chamber and electrically connected to a digital ohm-meter. The temperature in the chamber is adjusted to 25° C. and allowed to equilibrate, after which the resistance of each substrate is measured and recorded.

The temperature of the chamber is then raised to 125° C. and allowed to equilibrate, after which the resistance of the substrate is again measured and recorded.

The temperature of the chamber is then cooled to −55° C. and allowed to equilibrate and the cold resistance measured and recorded.

GLASS PREPARATION

The preparation of glass frits is well-known and consists, for example, melting together the constituents of the glass in the form of the oxides of the constituents and pouring the molten composition into water to form the frit. The batch ingredients may, of course, be any compound that will yield the desired oxides under the usual conditions of frit production. For example, boric oxide will be obtained from boric acid; silicon dioxide will be produced from flint; barium oxide will be produced from barium carbonate; etc. The glass is preferably milled in a ball mill with water to reduce the particle size of the frit and to obtain a frit of substantially uniform size. The glasses are prepared by convention glassmaking techniques by mixing the desired components in the desired proportions and heating the mixture to form a melt. As is well known in the art, heating is conducted to a peak temperature and for a time such that the melt becomes entirely liquid and homogeneous. In the present work, the components are premixed by shaking in a polyethylene jar with plastic balls and then melted in a platinum crucible at the desired temperature. The melt is heated at a peak temperature of 1100°–1400° C. for a period of 1–1½ hours. The melt is then poured into cold water. The maximum temperature of the water during quenching is kept as low as possible by increasing the volume of water to melt ratio. The crude frit after separation from water is freed from residual water by drying in air or by displacing the water by rinsing with methanol. The crude frit is then ball milled for 3–15 hours in alumina containers using alumina balls. Alumina picked up by the materials, if any, is not within the observable limit as measured by X-ray diffraction analysis. After discharging the milled frit slurry from the mill, excess solvent is removed by decantation and the frit powder is air-dried at room temperature. The dried powder is then screened through a 325 mesh screen to remove any large particles.

The major two properties of the frit are that it aids the liquid phase sintering of the inorganic crystalline particulate materials and forms noncrystalline (amorphous) or crystalline materials by devitrification during the heating-cooling cycle (firing cycle) in the preparation of thick film compositions. This devitrification process can yield either a single crystalline phase having the same composition as the precursor noncrystalline (glassy) material or multiple crystalline phases with different compositions from that of the precursor glass material.

COMPOSITION PREPARATION

In the preparation of the composition of the present invention, the particulate inorganic solids are mixed with the organic carrier and dispersed with suitable equipment, such as a three-roll mill, to form a suspension, resulting in a composition for which the viscosity will be in the range of about 100–150 pascalseconds at a shear rate of 4 sec$^{-1}$.

In the examples which follow, the formulation was carried out in the following manner: The organics used in the examples consist of a mixture of diethylene glycol dibutyl ether, terpineol, ethyl cellulose and soya lecithin. The ingredients of the paste, minus about 5% organic components equivalent to about 5% wt., are weighted together in a container. The components are then vigorously mixed to form a uniform blend; then the blend is passed through dispersing equipment, such as a three-roll mill, to achieve a good dispersion of particles. A Hegman gauge is used to determine the state of dispersion of the particles in the paste. This instrument consists of a channel in a block of steel that is 25 μm deep (1 mil) on one end and ramps up to 0" depth at the other end. A blade is used to draw down paste along the length of the channel. Scratches will appear in the channel where the agglomerates' diameter is greater than the channel depth. A satisfactory dispersion will give a fourth scratch point of 10–18 typically. The point at which half of the channel is uncovered with a well dispersed paste is between 3 and 8 typically. Fourth scratch measurement of >10 μm indicate a poorly dispersed suspension.

The remaining 5% consisting of organic components of the paste is then added, and the resin content is adjusted to bring the viscosity when fully formulated to between 140 to 200 Pa.s at a shear rate of 4 $sec^{-1}$ The composition is then applied to a substrate, such as alumina ceramic, usually by the process of screen printing, to a wet thickness of about 30–80 microns, preferably 35–70 microns, and most preferably 40–50 microns. The compositions of this invention can be printed onto the substrates either by using an automatic printer or a hand printer in the convention manner, preferably automatic screen stencil techniques are employed using a 200- to 325-mesh screen. The printed pattern is then dried at below 200° C., about 150° C., for about 5–15 minutes before firing. Firing to effect sintering of both the inorganic binder and the finely divided particles of metal is preferably done in a well ventilated belt conveyor furnace with a temperature profile that will allow burnout of the organic matter at about 300°–600° C., a period of maximum temperature of about 700°–1000° C. lasting about 5–15 minutes, followed by a controlled cool down cycle to prevent over sintering, unwanted chemical reactions at intermediate temperatures or substrate fracture which can occur from too rapid cool down. The overall firing procedure will preferably extend over a period of about 1 hour, with 20–25 minutes to reach the firing temperature, about 10 minutes at the firing temperature and about 20–25 minutes in cool down. In some instances, total cycle times as short as 30 minutes can be used.

EXAMPLES

EXAMPLES 1–11

Ten glasses were prepared by the above method, milled, and characterized by X-ray Diffraction (XRD) and Differential Thermal Analysis (DTA). The glass transition temperature (Tg) as obtained from DTA and dilatometric measurement were in the range of 300°–550° C. and preferably 350°–500° C. 10 glasses in accordance with the invention are given in Table I. Example 11 is a commercially available product made by E. I. du Pont de Nemours and Co., Wilmington, Del.

Compositions in mole % are given in Table I along with a commercially available Cd & Pb free glass (Example 11). All the experimental glasses contain 30.0 mole % of $SiO_2$, the other 70 mole % consists of $Bi_2O_3$ as such (Example 2 in table 1) or a combination of transition metal oxides and $Bi_2O_3$. The $Bi_2O_3$-$SiO_2$ system is a very powerful solvent for transition metal oxides; at fixed $SiO_2$ concentration of 30 mole % these glasses can dissolve substantial amounts of transition metal oxides.

TABLE I

| | Glass compositions in mole % | | | | | | | | | | |
|---|---|---|---|---|---|---|---|---|---|---|---|
| | Example No. | | | | | | | | | | |
| | 1 | 2 | 3 | 4 | 5 | 6 | 7 | 8 | 9 | 10 | 11 |
| BaO | — | — | — | — | — | — | — | — | — | — | 17.22 |
| MgO | — | — | — | — | — | — | — | — | — | — | 2.00 |
| ZnO | 10.0 | — | — | 20.0 | — | — | — | — | — | — | 6.70 |
| CuO | 20.0 | — | 40.0 | — | — | — | — | — | — | — | 0.50 |
| CoO | 5.0 | — | — | — | 20.0 | 40.0 | — | — | — | — | — |
| MnO | — | — | — | — | — | — | 20.0 | 40.0 | — | — | — |
| $Fe_2O_3$ | — | — | — | — | — | — | — | — | 20.0 | 40.0 | — |
| $Al_2O_3$ | — | — | — | — | — | — | — | — | — | — | 4.30 |
| $B_2O_3$ | — | — | — | — | — | — | — | — | — | — | 42.35 |
| $Bi_2O_3$ | 35.0 | 70.0 | 30.0 | 50.0 | 50.0 | 30.0 | 50.0 | 30.0 | 50.0 | 30.0 | 5.00 |
| $SiO_2$ | 30.0 | 30.0 | 30.0 | 30.0 | 30.0 | 30.0 | 30.0 | 30.0 | 30.0 | 30.0 | 17.40 |
| $ZrO_2$ | — | — | — | — | — | — | — | — | — | — | — |

EXAMPLES 12–16

The following samples illustrate the applicability of the new bismuthate glasses for TF resistors. Further improvements in properties and extension of resistance range can be realized with inclusion of fillers and TCR drivers.

TABLE II

| | Composition (wt %) | | | | |
|---|---|---|---|---|---|
| | Example No. | | | | |
| | 12 | 13 | 14 | 15 | 16 |
| $(Bi_1Gd) Ru_2O_7$ | 30.0 | 30.0 | 30.0 | 30.0 | 30.0 |
| Ex 11 glass | — | 40.0 | 10.0 | 20.0 | 30.0 |
| Ex 2 glass | 40.0 | — | 30.0 | 20.0 | 10.0 |
| Organics to 100% | | | -> | | |
| R(Ω/□/mil) | 265.3 | 1318.2 | 868.4 | 585.7 | 2441.1 |
| CV (%) | 4.34 | 9.00 | 5.12 | 8.17 | 7.14 |
| HTCR (ppm/°C.) | −1128 | 287.7 | −814.2 | −403.5 | −364.2 |
| CTCR (ppm/°C.) | −2199 | 198.3 | −1483.0 | −747.3 | −646.9 |

Figure 1:
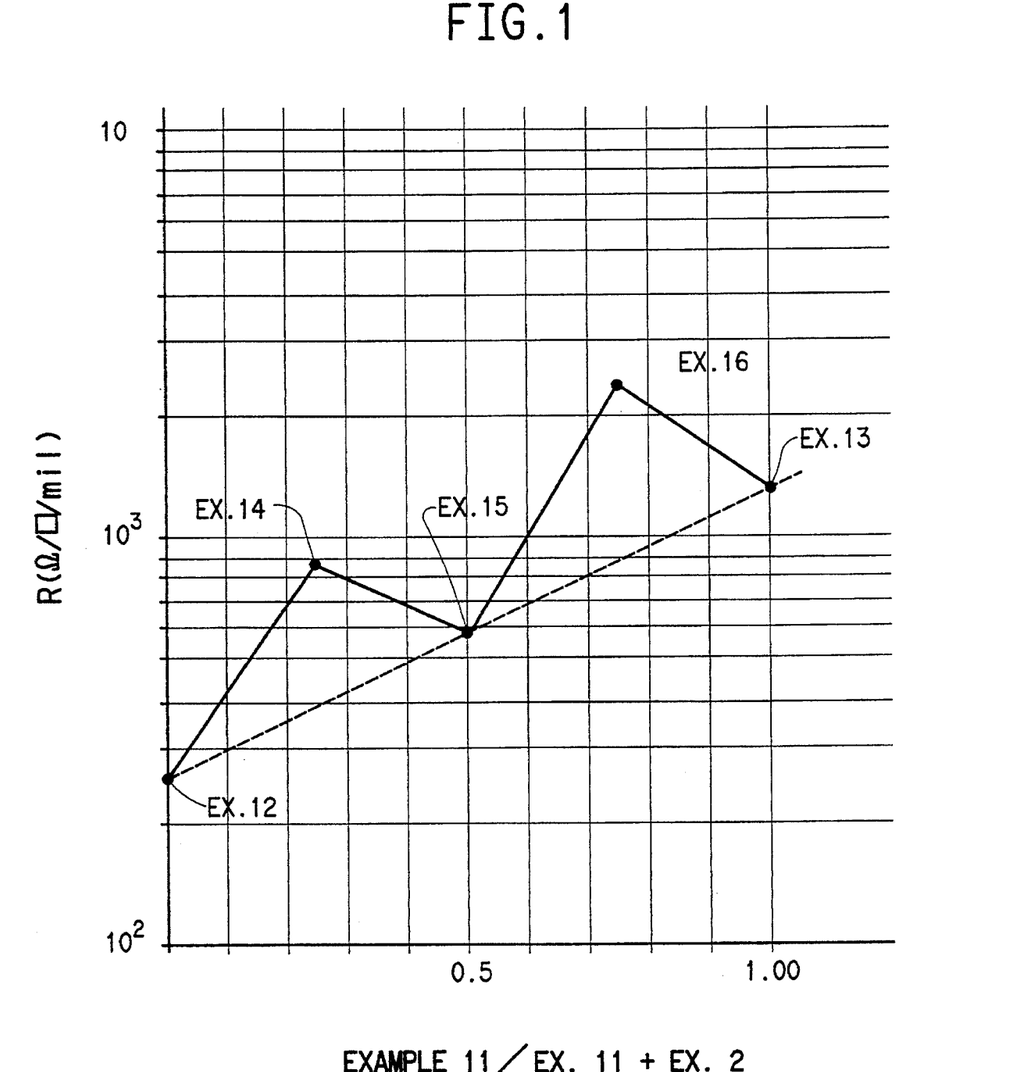
FIG. 1—Resistance as a function of the glasses ratio [Example 11/(Example 11+Example 2)] in the system Example 11–Example 2–$BiGdRu_2O_7$, conductive concentration constant 30 wt. %.
Figure 2:
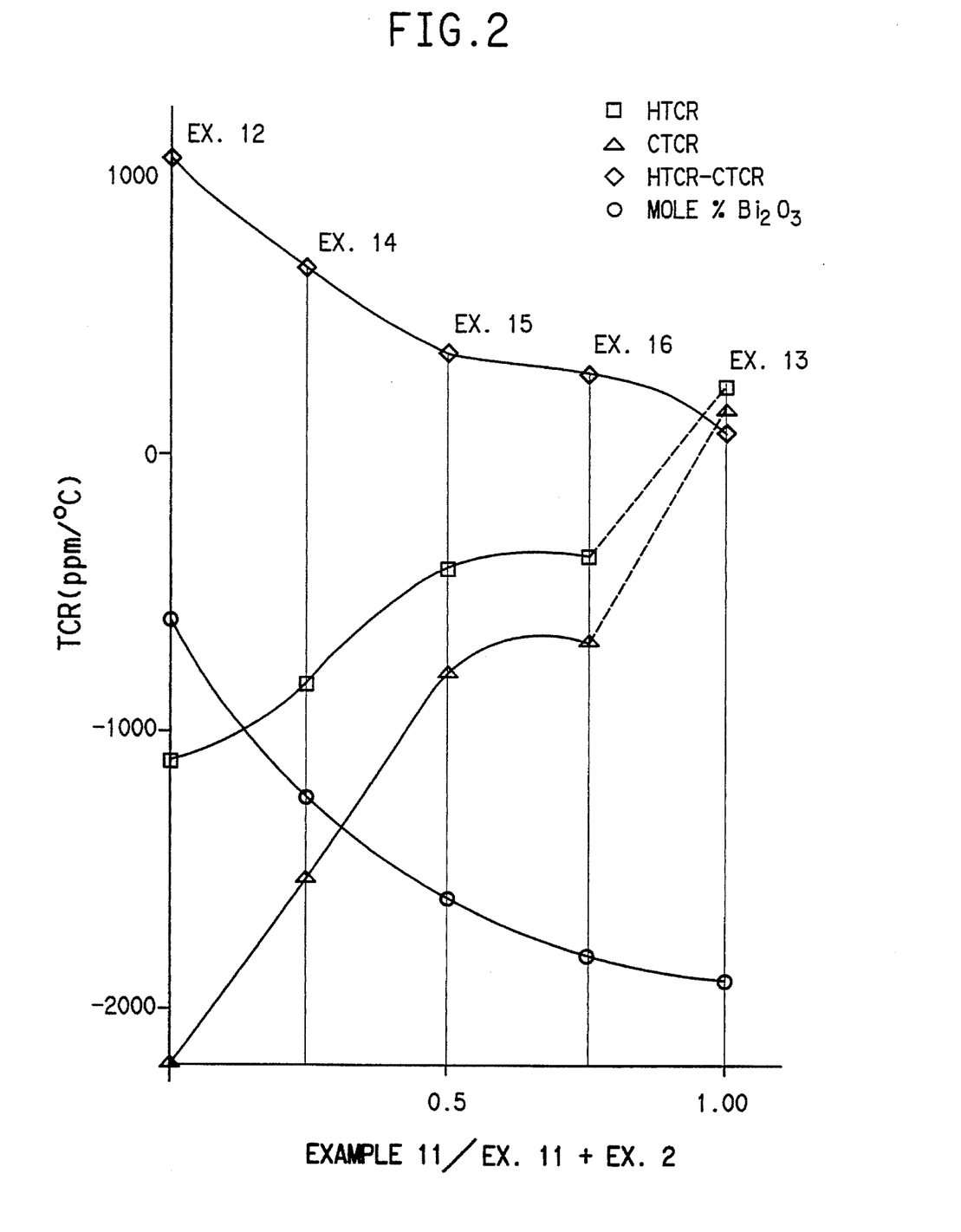
FIG. 2—HTCR, CTCR and GAP (HTCR-CTCR) as a function of the glasses ratio [(Example 11/(Example 11+Example 2)] in the system Example 11–Example 2–$BiGdRu_2O_7$ at constant concentration (30 wt. %) of conductive.

Properties of Examples 12–16 are given in table II and FIGS. 1 and 2. Table II shows that Example 2 glass (70 m/o $Bi_2O_3$; 30 m/o $SiO_2$) imparts very negative TCR and fairly low resistance. Blending with Example 11 increases the resistance and HTCR and decreases the gap (HTCR-CTCR). FIG. 2 shows that compositions with low TCR and gap can be obtained when $$\frac{\text{Example 11}}{\text{Ex 11 + Ex 2}}$$

ratio is in the 0.9–1.0 range, resistance at this ratio range (FIG. 1) is 1.5 k $\Omega/\square$/mil

TABLE III

| | \multicolumn{5}{c}{Compositions (wt %)} | | | | |
|---|---|---|---|---|---|
| | \multicolumn{5}{c}{Example No.} | | | | |
| | 17 | 18 | 19 | 20 | 21 |
| $(Bi_1Gd) Ru_2O_7$ | 20.0 | 20.0 | 20.0 | 20.0 | 20.0 |
| Ex 11 glass | — | 50.0 | 12.5 | 25.0 | 37.5 |
| Ex 2 glass | 50.0 | — | 37.5 | 25.0 | 12.5 |
| Organics to 100% | | | -> | | |
| R (k$\Omega/\square$/mil) | 0.744 | 30.809 | 11.786 | 15.485 | too high > 80 M$\Omega$ |
| CV (%) | 4.05 | 27.4 | 10.6 | 25.0 | |
| HTCR (ppm/°C.) | −1025 | 414.8 | −945.8 | −559.7 | |
| CTCR (ppm/°C.) | −1944 | 299.2 | −1728.0 | −1017.0 | |

*Examples 19, 20, and 21 were prepared by blending the appropriate amounts of Examples 17 and 18. (Examples 17 and 18 were prepared by roll milling).

EXAMPLES 17–21

Figure 3:
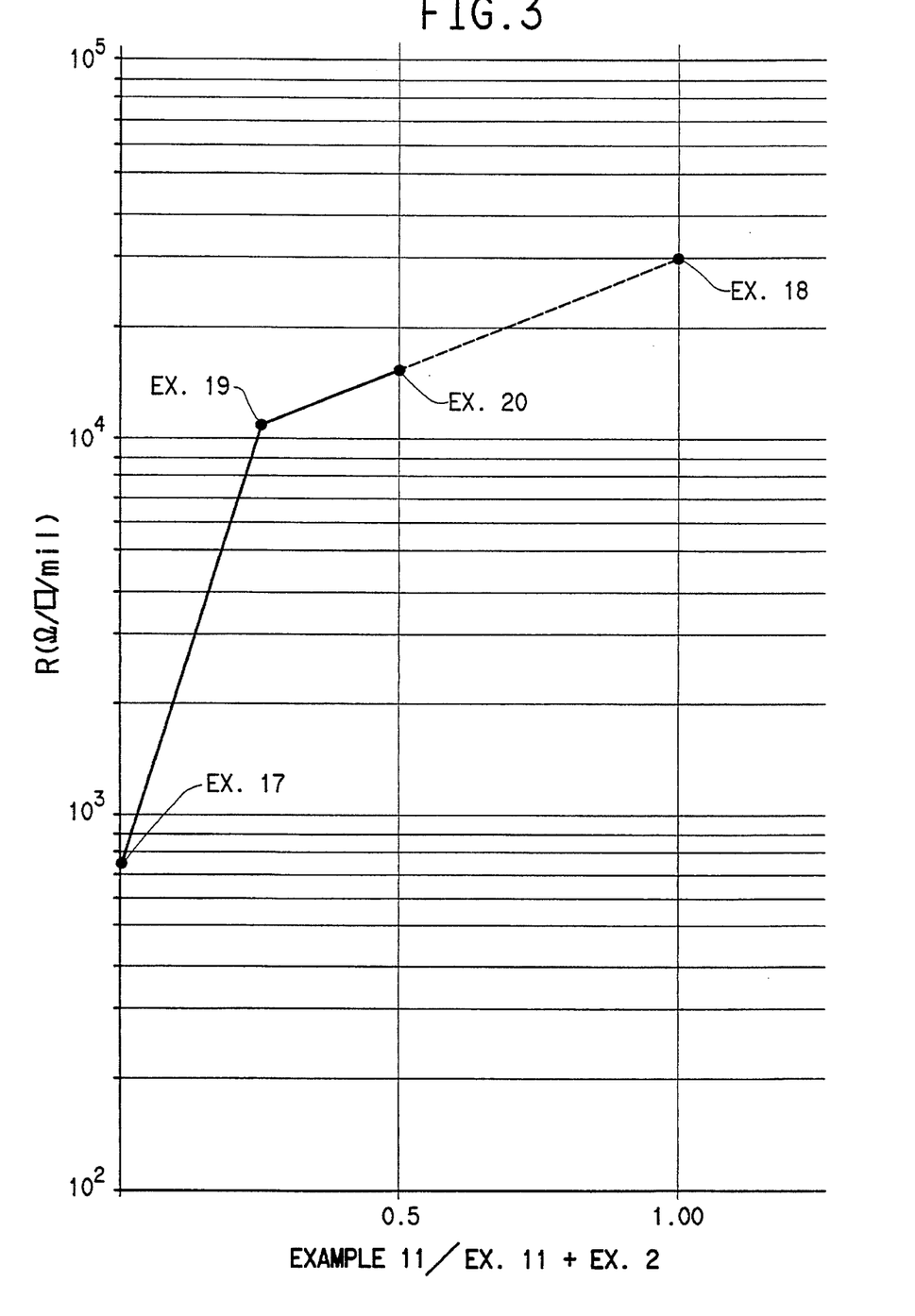
FIG. 3—Resistance as a function of the glasses ratio [Example 11/(Example 11+Example 2)] in the system Example 11–Example 2–$BiGdRu_2O_7$ at constant concentration (20 wt. %) of conductive.
Figure 4:
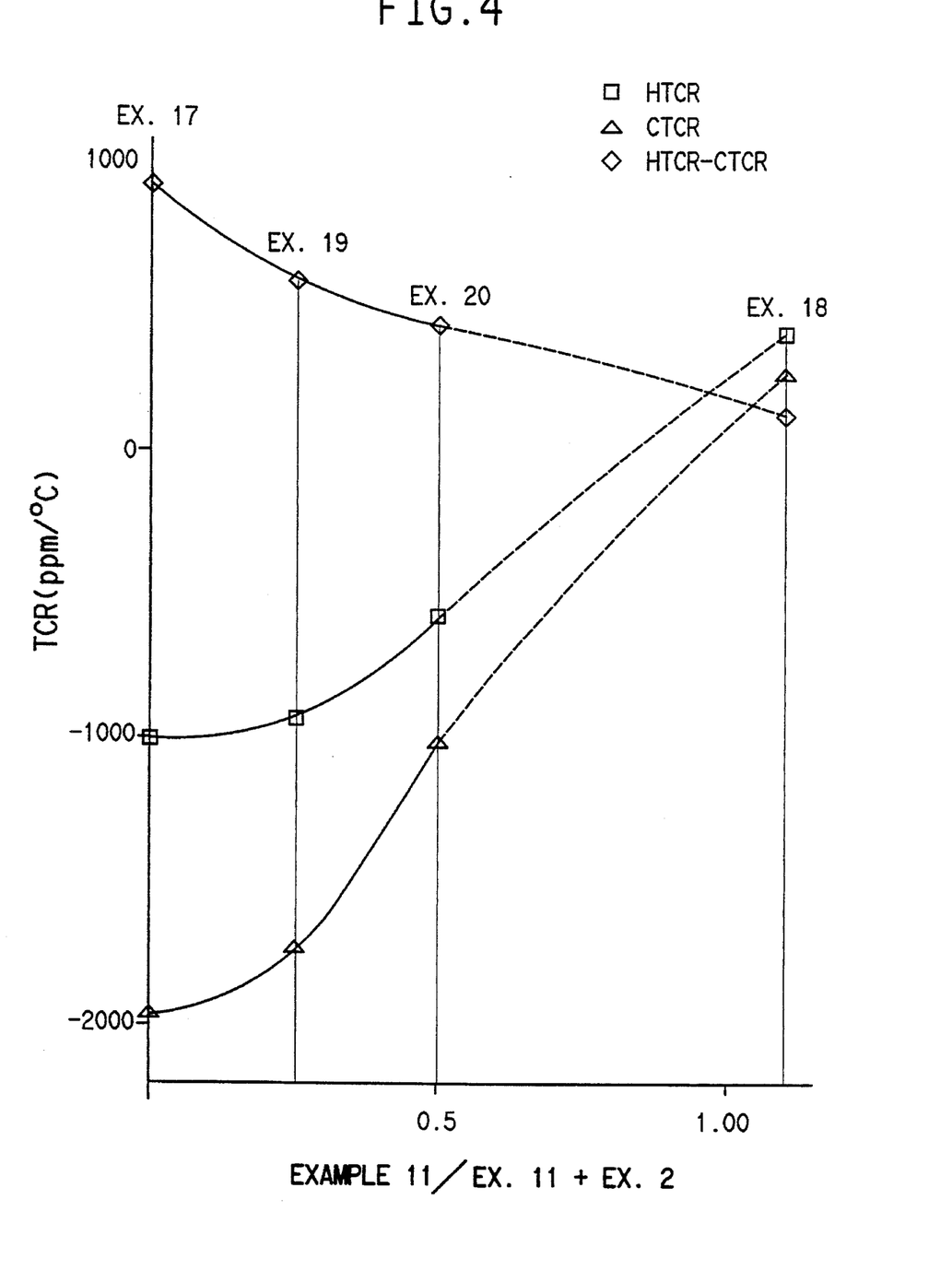
FIG. 4—HTCR, CTCR and GAP as a function of the glasses ratio [Example 11/(Example 11+Example 2)] in the system Example 2–Example 11–$BiGdRu_2O_7$ at constant concentration (20 wt. %) of conductive.

Data for Examples 17–21 wherein $(Bi_1Gd) Ru_2O_7$ is 20 wt % is found in Table III and FIGS. 3 and 4.

Again the dominant theme is the low TCR impacted by the bismuthate glass and the increase in TCR and R caused by the addition of Example 11 glass. Here, also the gap (HTCR-CTCR) decreases with the addition of Example 11 glass. Low TCR, low gap and higher resistance (FIGS. 3 and 4) are likely at $$\frac{\text{EXAMPLE 11}}{\text{Ex. 11 + Ex. 2 glass}}$$

ratio in the range of 0.9–1.0.

Figure 5:
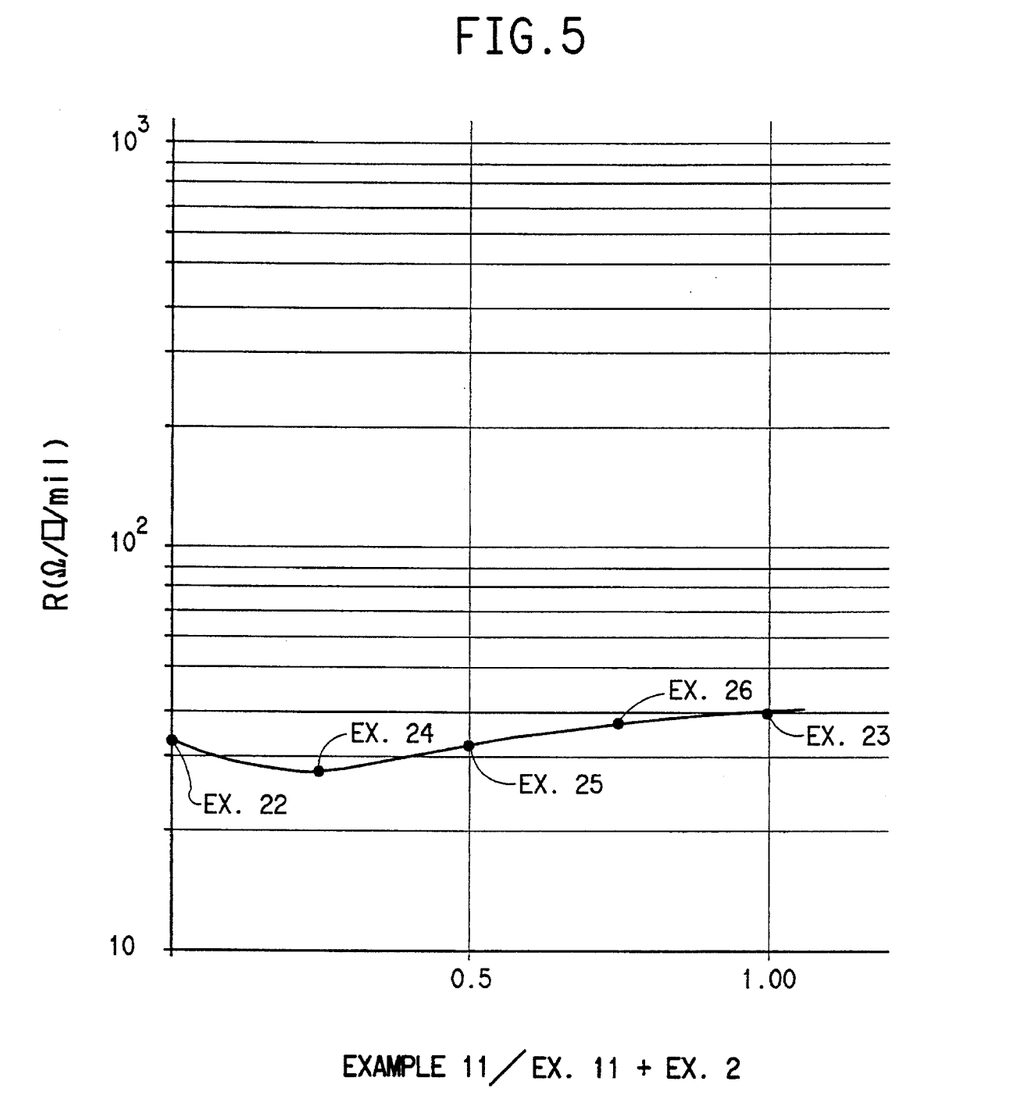
FIG. 5—Resistance as a function of the glasses ratio [Example 11/(Example 11+Example 2)] in the system Example 2–Example 11–$RuO_2$ at constant concentration (20 wt. %) of conductive.
Figure 6:
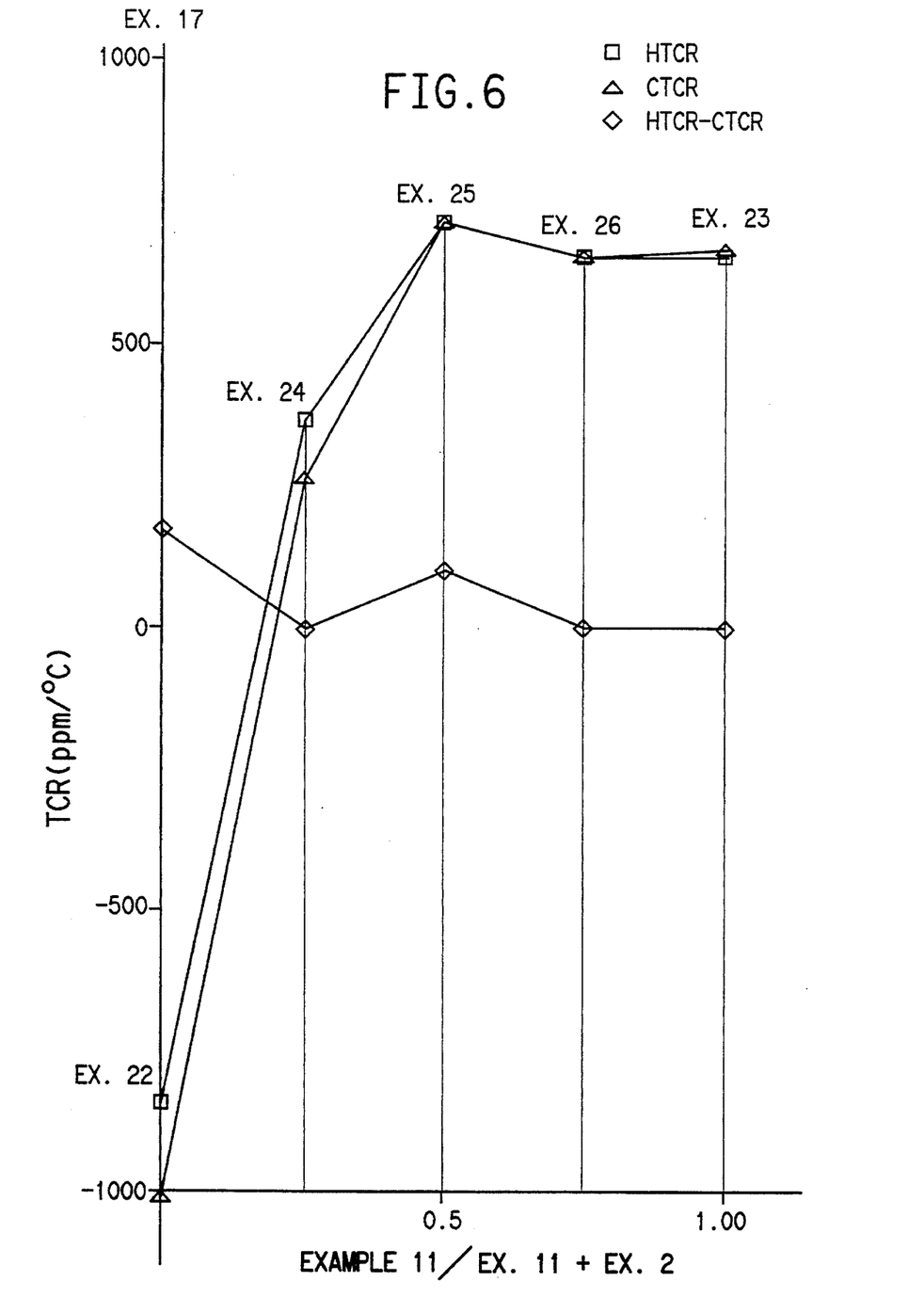
FIG. 6—HTCR, CTCR and GAP as a function of the glasses ratio [Example 11/(Example 11+Example 2)] in the system Example 2–Example 11–$RuO_2$ at fixed concentration of (20 wt. %) of conductive.

The electrical properties achieved by the use of other conductives such as $RuO_2$ with the same bismuthate glasses, are illustrated in Table IV and FIGS. 5 and 6.

TABLE IV

| | \multicolumn{5}{c}{Compositions (wt %)} | | | | |
|---|---|---|---|---|---|
| | \multicolumn{5}{c}{Example No.} | | | | |
| | 22 | 23 | 24 | 25 | 26 |
| $RuO_2$ | 20.0 | 20.0 | 20.0 | 20.0 | 20.0 |
| Ex 11 glass | — | 50.0 | 12.5 | 25.0 | 37.5 |
| Ex 2 glass | 50.0 | — | 37.5 | 25.0 | 12.5 |
| organics to 100% | | | -> | | |
| R ($\Omega/\square$/mil) | 32.46 | 41.84 | 25.71 | 31.679 | 35.10 |
| CV (%) | 6.47 | 7.52 | 4.38 | 3.04 | 3.78 |
| HTCR (ppm/°C.) | −844.9 | 647.9 | 370.2 | 719.9 | 654.4 |
| CTCR (ppm/°C.) | −1022.0 | 656.5 | 263.6 | 718.5 | 652.2 |

Table IV and FIGS. 5 and 6 illustrate the following: low resistance with $RuO_2$/bismuthate glass (22) and simultaneously very low TCR. These are unique properties, usually TCR increases as resistance decreases. This unique property can be utilized to emplify existing products; by addition of these new bismuthate glasses to existing low resistance compositions, one would expect low TCR and the possible elimination of existing TCR drivers ($Nb_2O_5$, $MnO_x$) which in turn decrease resistance and probably enhance stability. Compositions with low TCR and gap in this system are located (FIG. 6) at $$\frac{\text{Example 11}}{\text{Ex. 11 + Ex. 2 glass}}$$

ratio in the range of 1.6–2.4. The increase in HTCR with Example 11 glass concentration can be utilized at high R; usually TCR decreases with R, increase of HTCR will allow inclusion of TCR drivers (at high R) which will lower TCR and improve handling and noise at high R (usually a problem with $RuO_2$ based resistors).

EXAMPLES 27–31

Figure 7:
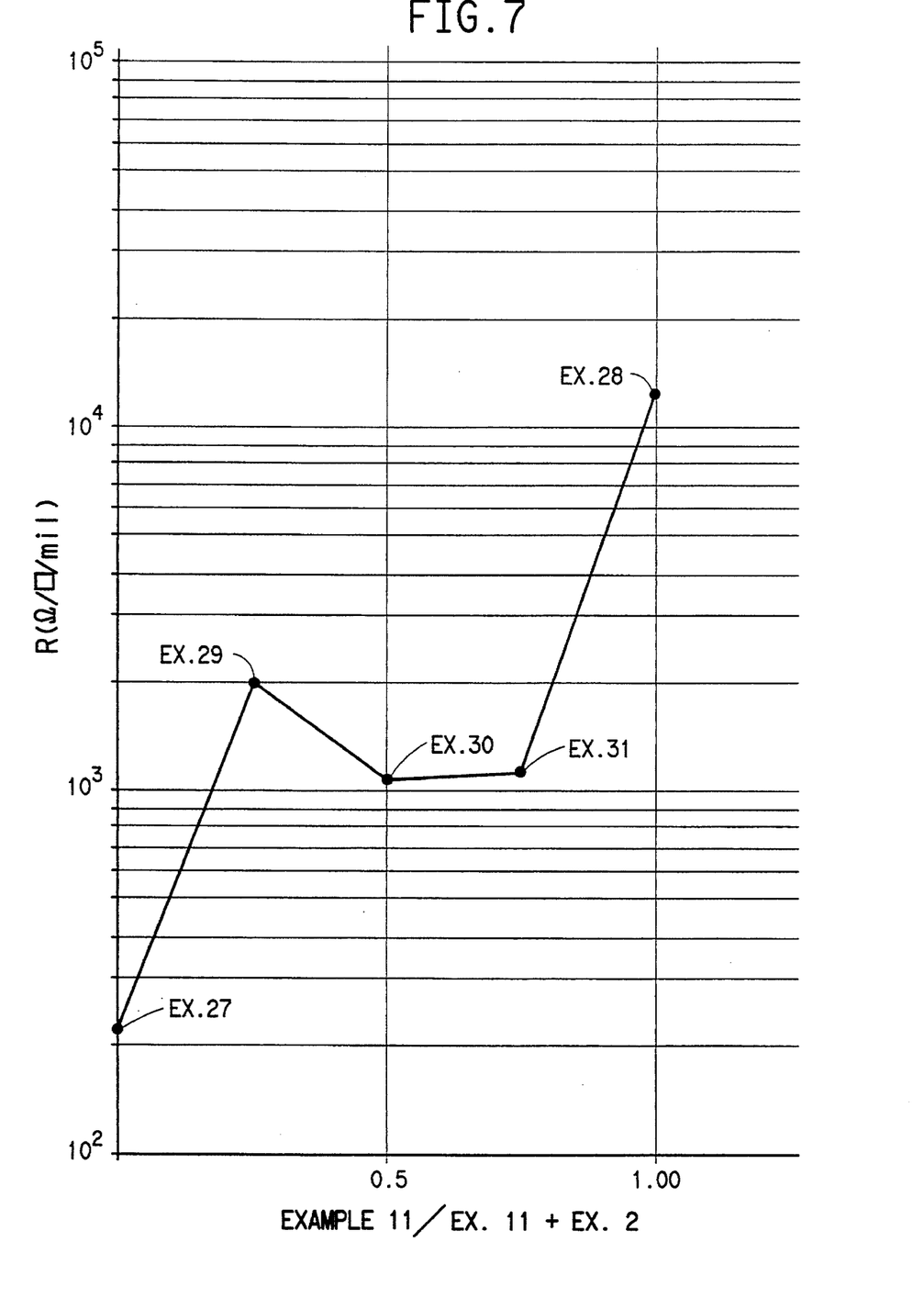
FIG. 7—Resistance as a function of the glasses ratio [Example 11/(Example 11+Example 3)] in the system Example 3–Example 11–$Bi_2Ru_2O_7$ at constant concentration (30 wt. %) of conductive.
Figure 8:
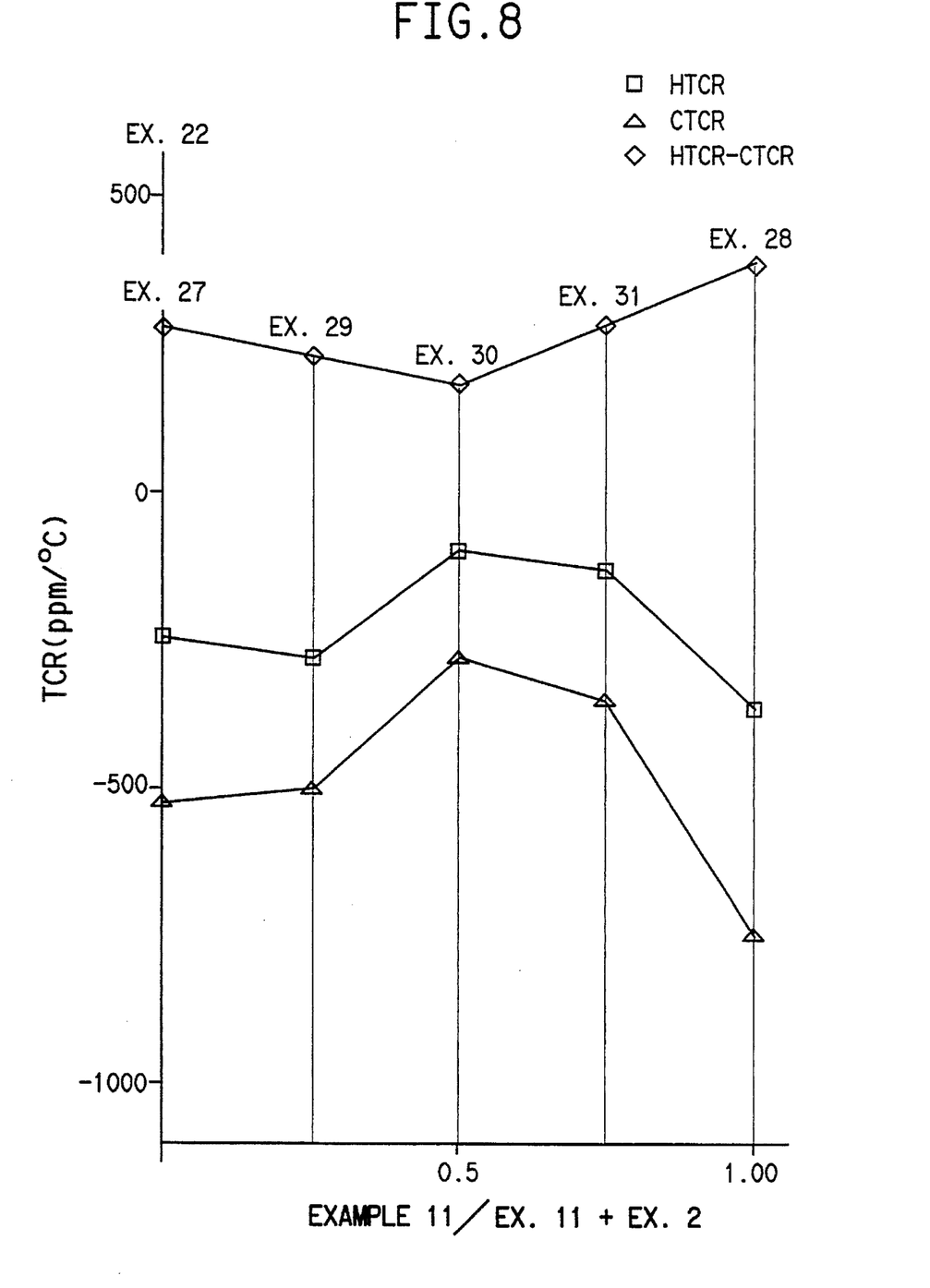
FIG. 8—HTCR, CTCR, and GAP as a function of the glasses ratio [Example 11/(Example 11+Example 3)] in the system Example 3–Example 11–$Bi_2Ru_2O_7$ at constant concentration (30 wt. %) of conductive.

Table V and FIGS. 7 and 8 illustrate the use of another conductive $Bi_2Ru_2O_7$ (Bismuth ruthenate) and copper containing bismuthate glass, Example 3 glass with $30Bi_2O_3$ $40CUO_x$ $30SiO_2$.

TABLE V

| | \multicolumn{5}{c}{Compositions (wt %)} | | | | |
|---|---|---|---|---|---|
| | \multicolumn{5}{c}{Example No.} | | | | |
| | 27 | 28 | 29 | 30 | 31 |
| $Bi_2Ru_2O_7$ | 30.0 | 30.0 | 30.0 | 30.0 | 30.0 |
| Ex 11 glass | — | 40.0 | 10.0 | 20.0 | 30.0 |
| Ex 3 glass | 40.0 | — | 30.0 | 20.0 | 10.0 |
| organics to 100% | | | -> | | |
| R ($\Omega/\square$/mil) | 226.1 | 12165.0 | 1991.9 | 1081.1 | 1184.0 |
| CV (%) | 9.32 | 14.0 | 12.7 | 8.49 | 6.15 |
| HTCR (ppm/°C.) | −239.9 | −371.7 | −274.4 | −97.7 | −137.1 |
| CTCR (ppm/°C.) | −520.9 | −760.1 | −498.7 | −272.9 | −350.6 |

*Examples 29, 30, and 31 were prepared by blending the appropriate amounts of Examples 27 and 28. (Examples 27 and 28 were prepared by roll milling).

The $Bi_2Ru_2O_7$ used in examples 27 to 31 is a fairly low surface area bismuth ruthenate. However, it still illustrates the properties in Cd and Pb free system. Table V and FIGS. 7 and 8 illustrate that bismuthate glass (Example 3) even with high concentration of CuO still impart a low TCR. The gap in this system is too high to make compositions useful. However, same glass (Example 3) with a higher surface area bismuth ruthenate may behave differently.

EXAMPLES 32–34

The following three (32–34) examples are designed to test the In situ formation of $Co_2RuO_4$ (a thermistor material). Here, two Co containing bismuthate glasses (Examples 5 and 6) are combined with $RuO_2$. The goal is to make low resistance NTC thermistors which has been a challenge in the art. Typically as the resistance decreases the TCR of NTC thermistor increases and it would be very useful to have low resistance NTC thermistors with quite negative TCR.

Compositions to test the In situ formation of $Co_2RuO_4$ are given in table VI.

TABLE VI

| | Composition (wt %) | | |
|---|---|---|---|
| | Example No. | | |
| | 32 | 33 | 34 |
| $RuO_2$ | 20.0 | 20.0 | 20.0 |
| Example 5 glass | 50.0 | — | |
| Example 6 glass | — | 50.0 | |
| Example 2 glass | | | 50.0 |
| organics to 100% | -> | | |
| FIRST FIRING | | | |
| R (Ω/□/mil) | 11.118 | −12.984 | 32.46 |
| CV (%) | 10.6 | 7.40 | 6.47 |
| HTCR (ppm/°C.) | −599.0 | −392.3 | −844.9 |
| CTCR (ppm/°C.) | −1019.0 | −678.1 | −1022.0 |
| SECOND FIRING | | | |
| R (Ω/□/mil) | 25.569 | 26.924 | 42.417 |
| CV (%) | 11.8 | 9.26 | 7.81 |
| HTCR (ppm/°C.) | −832.8 | −530.4 | −607.6 |
| CTCR (ppm/°C.) | −1333.0 | −877.0 | −1137.0 |
| THIRD FIRING | | | |
| R (Ω/□/mil) | 40.508 | 49.757 | 54.617 |
| CV (%) | 10.2 | 11.5 | 11.6 |
| HTCR (ppm/°C.) | −962.4 | −706.5 | −650.0 |
| CTCR (ppm/°C.) | −1469.0 | −1091.0 | −1265.0 |
| FOURTH FIRING | | | |
| R (Ω/□/mil) | 51.757 | 90.803 | 63.352 |
| CV (%) | 8.71 | 16.0 | 12.5 |
| HTCR (ppm/°C.) | −1008.0 | −918.3 | −670.0 |
| CTCR (ppm/°C.) | −1474.0 | −1299.0 | −1322 |

Table VI data show that Co- containing glasses/$RuO_2$ combinations, result in a low resistance and quite negative TCR. TCR is decreasing with refires and the resistance increases.

Figure 9:
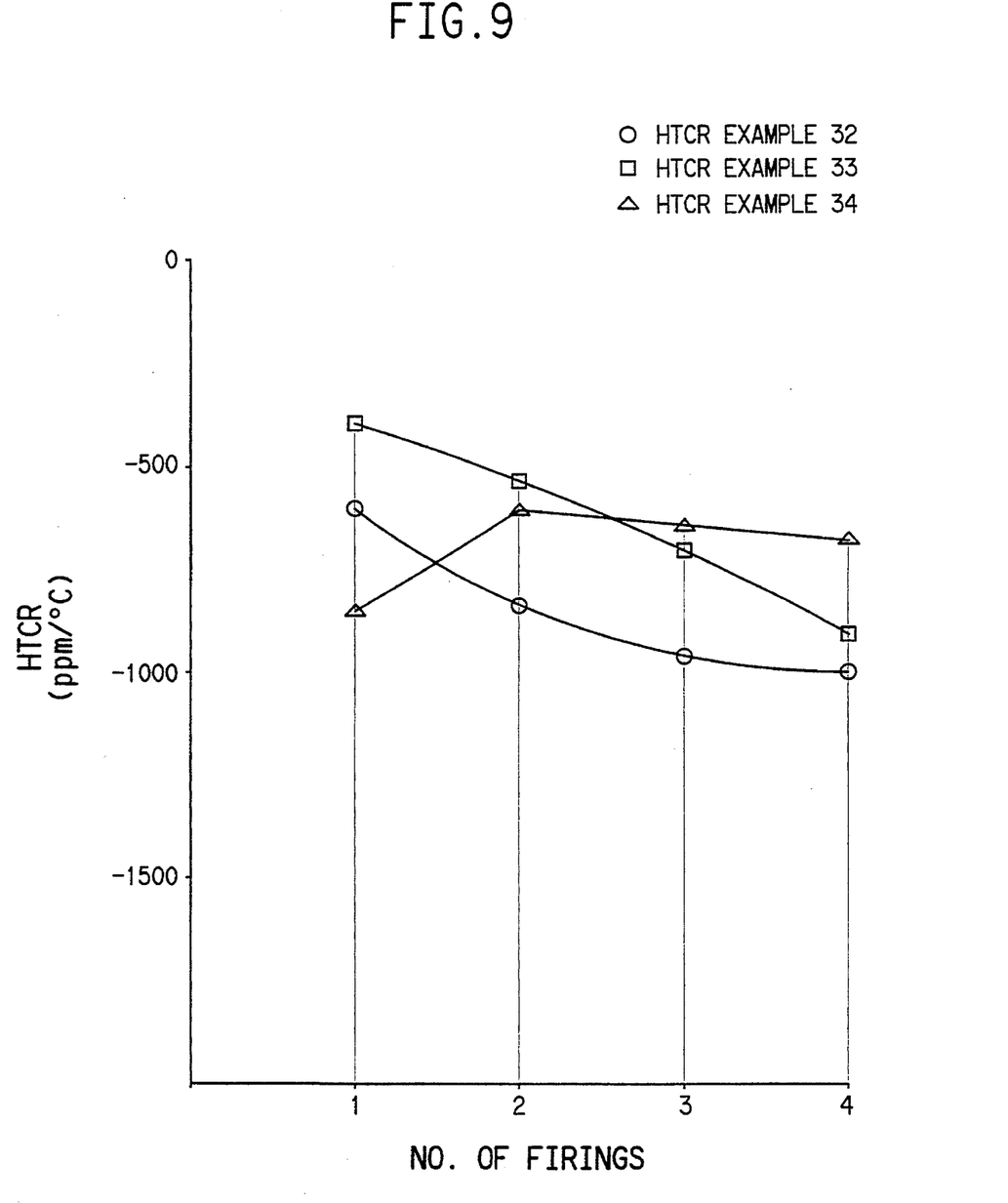
FIG. 9—HTCR as a function of the [Example 11/(Example 3+Example 11)] number of firings.

Further, Examples 32 and 33 show unusual behavior of TCR as a function of the number of firings. These examples are compared with Example 34 (which contain the same concentration of $RuO_2$ but with a simple bismuth silicate glass $70Bi_2O_3$, $30SiO_2$ comparative electricals of examples 32, 33, and 34 as a function of the number of firings are collected in Table VI and corresponding HTCR is given in FIG. 9. The two cobalt containing glasses (Examples 32 and 33) have a low resistance and negative TCR which is unique to the glasses of this invention. The HTCR of Example 34 is smaller than the HTCR of Examples 32 and 33 after the first firing. As the number of firings increases, Examples 32 and 33 show monotonic decrease in HTCr, while Example 34 shows an increase in HTCR after the second firing and very small change in HTCR on the third and fourth firings.

Without being bound by any theory or explanation, it is believed that the unique behavior of the cobalt containing glasses can effectively be utilized in low resistance NTC thermistors. One can speculate that $Co_2RuO_4$ is formed in situ in Examples 32 and 33.

EXAMPLES 35–47

A series of twelve thick film compositions was prepared from mixtures of glasses of Examples 4, 5 and 9 by mixing them with $(Bi_1Gd)Ru_2O_7$ and $Co_2RuO_4$ and adding organics to the level of 95% wt. Data is given in Table VII. Table VII illustrates the R and TCR of various combinations in the system:

$RuO_2$—$Co_2RuO_4$-bismuthate glass. Example 35 serves as a reference point; a simple system $RuO_2$-Example 5 glass (cobalt glass).

The examples demonstrate a low resistance with small negative TCR. Examples 36, 37, and 46 show R and TCR in a simple system $Co_2RuO_4$-glass 5.

Also, these examples demonstrate a very negative TCR. Examples 36, 44, and 45 illustrate the effect of the glass composition in the $Co_2RuO_4$—Bi-glass system, for a fixed concentration of $Co_2RuO_4$.

Zinc glass (Example 44) has larger TCR than composition containing Co and Fe glasses, Examples 36 and 45, respectively. Examples 36, 44, and 45 show that Co and Fe glasses are superior to a zinc glass in lowering the TCR. Examples 46 and 47 illustrate a very negative TCR at vΩ range, again these negative TCR are unique to $Co_2RuO_4$—Co and Fe bismuthate glasses of this invention. Examples 38 to 43 deal with the system $RuO_2$—$Co_2RuO_4$-glass 5. Here the resistance can be tailored by using different ratio of $RuO_2$ to $Co_2RuO_4$ and the TCR is still low and suitable for low resistance NTC thermistors.

TABLE VII

| | Composition (wt %) | | | | | | |
|---|---|---|---|---|---|---|---|
| | Example No. | | | | | | |
| | 35 | 36 | 37 | 38 | 39 | 40 | 41 |
| $RuO_2$ | 20.0 | — | — | 5.0 | 10.0 | 15.0 | 5.0 |
| $Co_2RuO_4$ | — | 40.0 | 20.0 | 30.0 | 20.0 | 10.0 | 15.0 |
| Ex. 5 glass | 50.0 | 30.0 | 50.0 | 35.0 | 40.0 | 45.0 | 50.0 |
| Ex. 4 glass | — | — | — | — | — | — | — |
| Ex. 9 glass | — | — | — | — | — | — | — |
| Organics 100% | | | | -> | | | |
| Resistivity (Ω/□/ml) | 11.12 | 207.79 | 10,665 | 56.16 | 58.17 | 43.69 | 127.55 |
| C.V. (%) | 10.6 | 5.07 | 20.5 | 5.46 | 6.90 | 4.46 | 4.83 |
| HTCR (ppm/°C.) | −599 | −4618 | −1772 | −2373 | −2014 | −1408 | −1207 |
| CTCR (ppm/°C.) | −1019 | −4273 | −2712 | −2180 | −2186 | −1902 | −1962 |
| | Example No. | | | | | |
| | 42 | 43 | 44 | 45 | 46 | 47 |

TABLE VII-continued

| | | | | | | |
|---|---|---|---|---|---|---|
| RuO$_2$ | 10.0 | 15.0 | — | — | — | — |
| Co$_2$RuO$_4$ | 10.0 | 5.0 | 40.0 | 40.0 | 50.0 | 50.0 |
| Ex. 5 glass | 50.0 | 50.0 | — | — | 20.0 | — |
| Ex. 4 glass | — | — | 30.0 | — | — | — |
| Ex. 9 glass | — | — | — | 30.0 | — | 20.0 |
| Organics | | | 100% —> | | | |
| Resistivity (Ω/□/ml) | 52.0 | 34.87 | 31.15 | 339.29 | 1986.0 | 1246.6 |
| C.V. (%) | 3.55 | 3.38 | 7.74 | 7.37 | 7.54 | 5.85 |
| HTCR (ppm/°C.) | −1121 | −1190 | −1175 | −4742 | −8137 | −7110 |
| CTCR (ppm/°C.) | −1867 | −1858 | −1495 | −4448 | −78.440 | −19,850 |

What is claimed is:

1. A thick film paste composition suitable for forming resistor or thermistor patterns on a substrate comprising by weight %, basis solids (a) 5– 65% wt. ruthenium-based conductive materials; (b) 95– 35% wt. glass composition consisting essentially of by mole % 5–70% Bi$_2$O$_3$, 18–35% SiO$_2$, 0.1–40% CuO, 5–25% ZnO, 0.5–40% CoO, 0.5–40% Fe$_2$O$_3$, and 0.5–40% MnO, wherein the glass composition is free of lead and cadmium; and, all of (a) and (b) dispersed in an organic medium.

2. The composition of claim 1 in which the ruthenium-based conductive material is selected from the group consisting of RuO$_2$, compounds corresponding to the formula (M$_c$Bi$_{2-c}$)(M'$_d$Ru$_{2-d}$)O$_{7-e}$ and mixtures thereof, wherein M is at least one of the group consisting of yttrium, indium, and the rare earth metals of atomic number 57-71, inclusive:

M' is at least one of platinum, titanium, chromium, rhodium and antimony;

c is a number in the range 0 to 2;

d is a number in the range 0 to about 0.5, provided that d is a number in the range 0 to 1 when M' is rhodium or more than one when M is platinum, and titanium; and e is a number in the range 0 to 1.

3. The thick film paste composition of claim 1 further comprising a second glass composition comprising by mole (%) (1) 65-85% glass-forming oxides containing 25–55% B$_2$O$_3$, 40–10% SiO$_2$ and 30–0% other glass forming oxides selected from Al$_2$O$_3$, Bi$_2$O$_3$, ZrO$_2$ and mixtures thereof, and (2) 35-15% glass modifying oxides consisting essentially of 3–35% alkaline earth metal oxide(s) of which no more than about 10% is MgO and 0–28% replacement oxide(s) selected from the group consisting of CuO, Cu$_2$O, ZnO and mixtures thereof, of which none exceeds 10% and the total of which does not exceed 80% of the total glass modifying oxides, wherein the second glass composition is free of lead and cadmium.

4. The composition of claim 1 in which the conductive material is Bi$_2$Ru$_2$O$_7$.

5. The composition of claim 1 in which the conductive material is BiGdRu$_2$O$_7$.

6. The composition of claim 1 in which the conductive material is Bi$_{1.5}$Cu$_{0.5}$RU$_2$O$_{6.1}$.

7. The composition of claim 1 in which the conductive material is RuO$_2$.

8. The composition of claim 1 in which the conductive material is Co$_2$RuO$_4$.

9. A thick film paste composition suitable for forming resistor or thermistor patterns on a substrate comprising by weight % basis solids (a) 5–65% wt. ruthenium-based conductive materials; (b) 95–35% wt. glass composition consisting essentially of by mole % 0–2% MgO, 0–20% BaO, 0–6% Al$_2$O$_3$, 0–45% B$_2$O$_3$, 0–5% ZrO$_2$, 18–35% SiO$_2$, 5–70% Bi$_2$O$_3$, 0–25% ZnO, 0.2–40% CuO, 0.1–40% CoO, 0.5–40% Fe$_2$O$_3$, and 0.5–40% MnO, wherein the glass composition is free of lead and cadmium; and, all of (a) and (b) dispersed in an organic medium.

* * * * *